United States Patent
Acharya et al.

(10) Patent No.: US 12,266,030 B2
(45) Date of Patent: Apr. 1, 2025

(54) PROCESSING SYSTEM WITH SELECTIVE PRIORITY-BASED TWO-LEVEL BINNING

(71) Applicant: ADVANCED MICRO DEVICES, INC., Santa Clara, CA (US)

(72) Inventors: Anirudh R. Acharya, San Diego, CA (US); Ruijin Wu, Santa Clara, CA (US); Young In Yeo, Santa Clara, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 204 days.

(21) Appl. No.: 17/231,425

(22) Filed: Apr. 15, 2021

(65) Prior Publication Data
US 2022/0156874 A1 May 19, 2022

Related U.S. Application Data

(60) Provisional application No. 63/113,605, filed on Nov. 13, 2020.

(51) Int. Cl.
G06T 1/20 (2006.01)
G06F 9/50 (2006.01)
G06T 7/11 (2017.01)

(52) U.S. Cl.
CPC ............. *G06T 1/20* (2013.01); *G06F 9/5005* (2013.01); *G06T 7/11* (2017.01)

(58) Field of Classification Search
CPC ............ G06T 1/20; G06T 7/11; G06F 9/5005
See application file for complete search history.

(56) References Cited

U.S. PATENT DOCUMENTS

| 8,817,026 B1 | 8/2014 | Zimmerman |
| 10,325,343 B1 | 6/2019 | Zhao et al. |

(Continued)

FOREIGN PATENT DOCUMENTS

| KR | 101723127 B1 | 4/2017 |
| KR | 101780059 B1 | 9/2017 |
| WO | 2018044738 A1 | 3/2018 |

OTHER PUBLICATIONS

Non-Final Office Action mailed Oct. 8, 2021 for U.S. Appl. No. 17/032,268, 18 pages.
U.S. Appl. No. 17/032,268, filed Sep. 25, 2020 listing Anirudh R. Acharya as first inventor, entitled, "Graphics Processing Unit With Selective Two-Level Binning,", 46 pages.
International Search Report and Written Opinion mailed Mar. 2, 2022 for PCT/US2021/059172, 11 pages.

(Continued)

*Primary Examiner* — Said Broome
*Assistant Examiner* — Donna J. Ricks

(57) ABSTRACT

Systems and methods related to priority-based and performance-based selection of a render mode, such as a two-level binning mode, in which to execute workloads with a graphics processing unit (GPU) of a system are provided. A user mode driver (UMD) or kernel mode driver (KMD) executed at a central processing unit (CPU) configures low and medium priority workloads to be executed in a two-level binning mode and selects a binning mode for high priority workloads based on whether performance heuristics indicate that one or more binning conditions or override conditions have been met. High priority workloads are maintained in a high priority queue, while low and medium priority workloads are maintained in a low/medium priority queue, such that execution of low and medium priority workloads at the GPU can be preempted in favor of executing high priority workloads.

20 Claims, 7 Drawing Sheets

(56) References Cited

U.S. PATENT DOCUMENTS

| | | | |
|---|---|---|---|
| 2004/0161064 | A1 | 8/2004 | Brethour et al. |
| 2005/0024365 | A1* | 2/2005 | Ohba ................... G06F 1/3287 |
| | | | 345/501 |
| 2006/0139699 | A1 | 6/2006 | Hara |
| 2007/0296725 | A1* | 12/2007 | Steiner ................... G06T 11/40 |
| | | | 345/505 |
| 2008/0301687 | A1 | 12/2008 | Gosalia |
| 2009/0003409 | A1 | 1/2009 | Hwang |
| 2012/0079480 | A1 | 3/2012 | Liu |
| 2012/0293519 | A1* | 11/2012 | Ribble ..................... G06T 1/20 |
| | | | 345/501 |
| 2013/0135341 | A1 | 5/2013 | Seetharamaiah et al. |
| 2013/0342547 | A1* | 12/2013 | Lum ...................... G06T 11/40 |
| | | | 345/505 |
| 2014/0104287 | A1 | 4/2014 | Nalluri et al. |
| 2014/0263964 | A1 | 9/2014 | Yang et al. |
| 2015/0070369 | A1 | 3/2015 | Frascati et al. |
| 2015/0302546 | A1 | 10/2015 | Balci et al. |
| 2015/0317762 | A1 | 11/2015 | Park et al. |
| 2017/0061568 | A1 | 3/2017 | Metz et al. |
| 2017/0083364 | A1 | 3/2017 | Zhao et al. |
| 2017/0083998 | A1* | 3/2017 | Acharya ................ G06F 9/461 |
| 2018/0165788 | A1 | 6/2018 | Balci et al. |
| 2019/0005604 | A1* | 1/2019 | Acharya ............... G06T 15/005 |
| 2019/0122417 | A1* | 4/2019 | Mantor ................ G06T 15/005 |
| 2019/0221009 | A1 | 7/2019 | Nellutla |
| 2019/0362005 | A1 | 11/2019 | Sen et al. |
| 2020/0082493 | A1* | 3/2020 | Wang ....................... G06T 1/20 |
| 2020/0090396 | A1* | 3/2020 | Holmes ................... G06T 1/20 |

OTHER PUBLICATIONS

Syed Hamid Hussain Madni et al., "Performance comparison of heuristic algorithms for task scheduling in IaaS cloud computing environment", PLOS ONE, vol. 12, No. 5, May 3, 2017, pp. 1-26.

U.S. Appl. No. 17/032,268, filed Sep. 25, 2020 Listing Anirudh R. Acharya as inventors, entitled "Graphics Processing Unit With Selective Two-Level Binning".

Final Office Action mailed May 13, 2022 for U.S. Appl. No. 17/032,268, 17 pages.

International Search Report and Written Opinion mailed Nov. 23, 2021 for PCT/US2021/044720, 10 pages.

International Preliminary Report on Patentability mailed May 25, 2023 for PCT/US2021/059172, 7 pages.

Non-Final Office Action mailed Dec. 7, 2022 for U.S. Appl. No. 17/032,268, 21 pages.

International Preliminary Report on Patentability issued in Application No. PCT/US2021/044720, mailed Feb. 16, 2023, 6 pages.

Non-Final Office Action issued in U.S. Appl. No. 17/032,268, mailed Dec. 12, 2023, 32 pages.

Extended European Search Report issued in Application No. 21853333, mailed Feb. 2, 2024, 10 pages.

Final Office Action issued in U.S. Appl. No. 17/032,268, mailed Jul. 26, 2023, 27 pages.

Extended European Search Report issued in Application No. 21892886, mailed Sep. 27, 2024, 9 pages.

Niski et al., "Tile-based level of detail for the parallel age," IEEE Transactions on Visualizaition and Computer Graphics, 13(6): 2007.

* cited by examiner

PROCESSING SYSTEM WITH SELECTIVE PRIORITY-BASED TWO-LEVEL BINNING

CROSS-REFERENCE TO RELATED APPLICATIONS

The present application claims priority to U.S. Provisional Patent Application Ser. No. 63/113,605, filed on Nov. 13, 2020 and entitled "TWO-LEVEL (HYBRID) BINNING AS A MECHANISM FOR PROVIDING GPU QUALITY OF SERVICE", the entirety of which is incorporated by reference herein.

BACKGROUND

Computer processing systems generally employ a graphics processing unit (GPU) to perform graphics operations, such as texture mapping, rendering, vertex translation, and the like. The performance requirements or specifications for the GPU can vary depending on the type of associated electronic device. For example, a GPU used in mobile devices or other battery-powered devices has characteristics and requirements that can diverge significantly from other non-battery-powered platforms. Performance, battery life, and thermals are generally important metrics for battery-powered device platforms, with sustained performance and low idle power consumption and temperature being desirable. However, a tradeoff generally exists between GPU performance and battery life/thermals in battery-powered devices.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
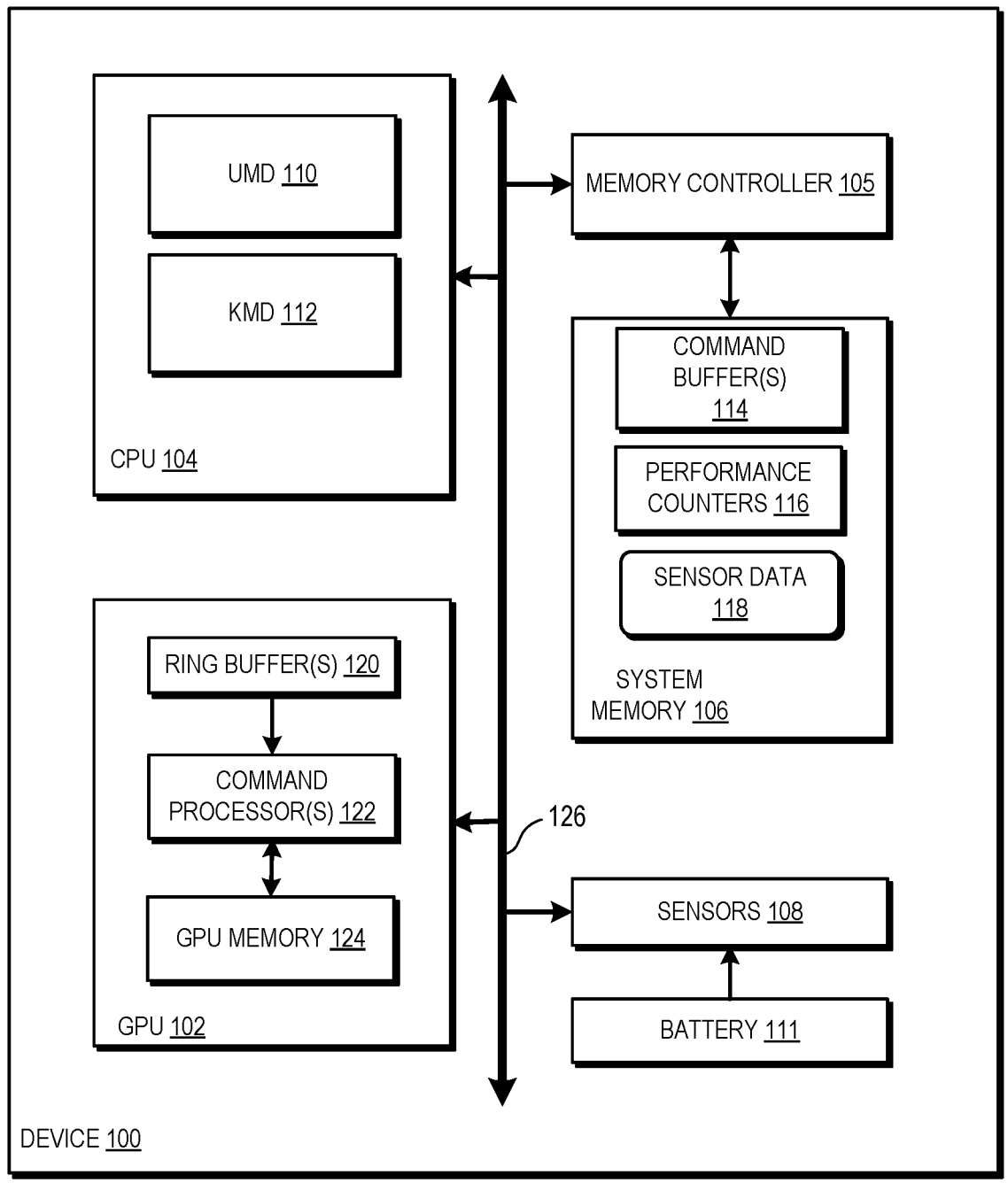
FIG. 1 is a block diagram of an illustrative device that sets a binning mode for GPU workloads based on GPU performance data, in accordance with some embodiments.

Using the techniques described herein, a GPU of a processing system selects a primitive binning mode (sometimes referred to herein as a "binning mode") for executing one or more workloads based on the performance characteristics of the processing system and based on the respective priorities of those workloads. When rendering an image frame, the binning mode defines a technique by which the image frame is divided into regions, and by which primitives are assigned to bins corresponding to each region. By selecting the binning mode based on the performance characteristics, the processing system adapts the rendering process according to the operating conditions of the system. According to various examples, the processing system improves the user experience by selecting a less hardware intensive binning mode, such as a two-level binning mode, to render image frames in response to detecting conditions such as low remaining battery life or high processing system temperature in order to reduce power consumption of the processing system or decrease the processing system temperature.

To illustrate, to render a frame (that is, to prepare a frame for transfer to and display at a display device, such as a display panel) a GPU translates information about three-dimensional (3D) objects into a two-dimensional (2D) image frame that can be displayed This process, at least in some cases, requires the considerable processing power and memory resources. During the rendering process, pixels within an image frame are produced by rendering graphical objects in order to determine color values for respective pixels. Example graphical objects include points, lines, polygons, and three-dimensional (3D) higher-order surfaces. Points, lines, and polygons represent rendering primitives which are the basis for most 3D rendering instructions. More complex structures, such as 3D objects, are formed from a combination or a mesh of such primitives. To display a particular scene using conventional rendering techniques, a GPU renders the primitives with potential contributing pixels associated with the scene individually, on a per-primitive basis by determining pixels that fall within the edges of each primitive and obtaining the attributes of the primitives that correspond to each of those pixels.

In other cases, a GPU renders primitives using a binning process, wherein the GPU divides the image frame into regions, identifies the primitives that intersect with a given region, and places the identified primitives into a bin corresponding to the given region. Thus, each region of the frame is associated with a corresponding bin, with the bin including the primitives, or portion of the primitives, that intersect with the associate bin. The GPU renders the frame on a per-bin basis by rendering the pixels of the primitives that intersect with the region of the frame corresponding to the bin. This allows the GPU to, at least in some cases, render a frame more efficiently, such as by requiring fewer memory accesses, increasing cache usage, and the like.

An example of a binning process is primitive batch binning (PBB), wherein a GPU receives a sequence of primitives and opportunistically segments the primitives into temporally related primitive batches. Sequential primitives are captured until a predetermined condition is met, such as a batch full condition, state storage full condition, or a dependency on previously rendered primitives is determined. When performing PBB, an image frame that displays a rendered primitive is divided into several blocks. Each block of image frame is associated with a respective bin. Each primitive of the received sequence of primitives of a batch intersects one or more bins. For each received primitive in a batch the initial bin intercept is computed, where an initial bin intercept is the upper-most left bin of the image frame which the primitive intersects. After a batch is closed, a first bin for processing is identified. Primitives intercepting the identified bin are processed. For each primitive identified intercepting the bin, the next bin intercept is identified, and the pixels included in the primitive that are enclosed by the identified bin are sent for detailed rasterization. The next bin intercept is the next upper-most left bin in raster order which the processed primitive intersects.

In some embodiments, a GPU implements different binning techniques, referred to herein as binning modes or primitive binning modes, wherein different binning modes employ different binning characteristics, such as different region sizes for each bin, different numbers of binning levels, and the like, or any combination thereof. For example, in some embodiments, the GPU includes both single level and two-level binning modes. In the single level binning mode, also referred to as primitive batch binning (PBB) mode, the GPU divides the image frame into a specified number of regions and renders each region as described above.

In the two-level binning mode, two types of binning are performed: coarse level binning and fine level binning. In some embodiments, coarse level binning uses large bins (e.g., 32 bins total to cover an entire display area), which reduces binning overhead. Per-coarse-bin visibility information is generated during the rendering of the first coarse bin (i.e., coarse bin 0), and is used for rendering other coarse bins. After coarse level binning, fine level binning is performed for each coarse bin, sequentially. In some embodiments, fine level binning involves performing primitive batch binning (PBB) to divide each coarse bin into smaller "fine" bins such as by further binning each coarse bin into a 64×64 array of fine bins during PBB-based fine level binning. Each fine bin is then rendered using rendering information, such as primitive visibility information, generated for the corresponding coarse bin. In some embodiments, two-level binning occurs at the top of the graphics processing pipeline (e.g., prior to vertex processing and rasterization), which contrasts with the single-level PBB-only binning mode, which occurs in the middle of the graphics processing pipeline, (e.g., after vertex processing and prior to pixel-shading).

In some cases, different binning modes are suitable for different device conditions. For example, single-level or PBB binning mode (where only PBB is used without the combination of coarse and fine level binning described above) under some conditions provides better performance than two-level binning but at the cost of increased power consumption and higher operating temperature for the device. In contrast, in some cases, two-level binning supports reduced power consumption at the cost of some performance.

To adapt the binning mode according to device conditions, in some embodiments a GPU employs a selective two-level binning architecture that supports the run-time selection of the render mode. For example, in some embodiments, a device implementing the selective two-level binning architecture implements a run-time selection of one of a two-level binning mode and a default render mode, such as a PBB render mode in which only PBB is performed. The selection of the binning mode is based on any of a number of performance criteria, such as thermal characteristics, power characteristics (e.g., battery life), and the like. For example, in some embodiments, a driver, such as a user-mode driver (UMD) or kernel-mode driver (KMD), receives performance data, such as sensor data and performance counter data, and selects the binning mode based on the performance data.

Additionally, in some embodiments, the GPU is configured to select the binning mode for a given workload based on the priority of that workload. The GPU is thus able to execute all applicable low priority or medium priority workloads in a two-level binning mode, while executing high priority workloads in either a two-level binning mode or a non-two-level binning mode based on the performance characteristics of the GPU or the system. By executing all applicable low priority and medium priority workloads in the two-level binning mode (i.e., not based on performance heuristics), the granularity of preemption of the GPU is improved. For example, an Application Programming Interface (API) does not typically provide the means to divide a workload into anything finer than full draw calls. In contrast, two-level binning, as described herein, divides a frame being rendered into multiple coarse bins, where each coarse bin is rendered separately, thereby breaking down draw calls that span multiple coarse bins of the frame into smaller chunks. It is sometimes necessary or desirable for a GPU to preempt a low priority or medium priority workload that is being executed by the GPU so that a high priority workload can be executed instead. This preemption of the execution of lower priority workloads in favor of higher priority workloads, sometimes referred to herein as "draw call preemption", helps to ensure that the execution of workloads of higher temporal importance is not unnecessarily delayed by the execution of less temporally important workloads.

The techniques described herein involve selectively executing workloads in accordance with the current two-level binning mode or a non-two-level binning mode, such as PBB render mode, based on one or both of performance heuristics and workload priority.

FIG. 1 illustrates an example of a device 100 that includes a parallel processor, and in particular a GPU 102 and that implements a two-level binning architecture that allows for run-time selection of a render mode with which to render image data. In addition to the GPU 102, the device 100 includes a CPU 104, a memory controller 105, a system memory 106, sensors 108, and a battery 111. In some embodiments, the GPU 102, the CPU 104, the memory controller 105, and the sensors 108 are communicatively coupled together via a bus 126. The memory controller 105 manages memory access requests provided by the GPU 102, the CPU 104, and the sensors 108 for accessing the system memory 106.

During a graphics processing operation, an application at the system memory 106 generates commands for instructing the GPU 102 to render image data at defined locations in the system memory 106 for subsequent display in an image frame at an electronic display (not shown) of the device 100. The commands output by the application are recorded onto one or more command buffers 114 by a UMD 110 that is executed at the CPU 104. A given command buffer 114 includes commands corresponding to one or multiple workloads, and each workload is configured to be executed in a two-level binning mode, a non-two-level binning mode, or is executable in either mode. Upon completing the recording of commands to the command buffer 114 by the UMD 110, a KMD 112 submits the command buffer 114 to the GPU 102 where the commands of the command buffer 114 are loaded onto one of one or more ring buffers 120 of the GPU 102. Herein, ring buffers such as the ring buffers 120 are sometimes represented as queues. In one example, a first ring buffer of the ring buffers 120 corresponds to a high priority queue and receives high priority workloads for execution by the GPU 102, while a second ring buffer of the ring buffers 120 corresponds to a low/medium priority queue and receives low priority and medium priority workloads for execution by the GPU 102. One or more command processors 122 of the GPU 102 retrieve commands corresponding to a particular command buffer 114 from the ring buffer(s) 120 and execute those commands by, for example, retrieving image data from the system memory 106, and instructing shaders, compute units, and other graphics processing circuitry (not shown) to render the retrieved image data. Herein, a "workload" refers to a command or group of commands to be processed by a GPU such as the GPU 102. According to various embodiments, a workload typically includes a set of work (e.g., graphics draws) for a given set of render targets, depth stencil targets, or buffers (e.g., unordered access views (UAVs)). In the example of FIG. 1, the GPU 102 selects between a two-level binning mode and a single-level binning mode, such as a PBB mode (sometimes referred to herein as a "single-level PBB mode" or a "single-level PBB-only binning mode"), when executing the workloads of the command buffer(s) 114. In some embodiments, the GPU 102 selects which binning mode to use to execute workloads of the command buffer(s) 114 based on one or more status bits stored in the system memory 106 or based on one or more patch enable bits (described below) stored in the GPU memory 124. In some embodiments, the GPU 102 selects the binning mode based on the status bits or patch enable bits when executing corresponding logic of a command buffer 114 that causes the GPU 102 to check the status bits or patch enable bits to determine which binning mode to use for execution of a corresponding workload of the command buffer(s) 114. In some embodiments, the CPU 104 selectively sets the values of the status bits and patch enable bits based on identified performance characteristics (sometimes referred to herein as "performance data" or "performance heuristics") of either or both of the device 100 and the GPU 102. In some embodiments, each workload stored at the command buffers 114 is indicated to be high priority, medium priority, or low priority (e.g., by a priority indicator, such as one that is included in or stored along with the workload or that is generated by the CPU 104 based on the function of the workload). In some embodiments, the CPU 104 selectively sets the values of the status bits and patch enable bits for high priority workloads to be executed in either the two-level binning mode or a non-two-level binning mode based on identified performance characteristics, and the CPU 104 configures all applicable low priority and medium priority workloads to be executed in the two-level binning mode (e.g., to improve the preemption granularity of the low priority and medium priority workloads). It should be noted that some workloads are not applicable for execution in the two-level binning mode, even if they are identified as low or medium priority workloads. For example, if a given workload uses API features that are not compatible with two-level binning, such as use of tessellated draw calls, atomics in shaders, read-modify-write of buffers in shaders, stream-out, or the like, the workload would not be applicable for execution in the two-level binning mode. In some embodiments, high priority workloads are stored in a different queue than low priority and medium priority workloads.

In some embodiments, a given command buffer 114 is configured such that some workloads stored in the command buffer 114 are executed in the one-level binning mode and other workloads in the same command buffer 114 are executed in the two-level binning mode. For example, some workloads are only executable using one-level binning, and are therefore always configured to be executed in the one-level binning mode, even if they are low priority or medium priority workloads, or even if they are high priority workloads and two-level binning conditions are met and the two-level binning mode is enabled. In some embodiments, workloads (e.g., high priority workloads) are recorded onto the command buffer 114 by the UMD 110 to be executable in either of the one-level binning mode and the two-level binning mode, and the binning mode in which these workloads are executed in is subsequently selected by the GPU at the time the workloads are executed.

Generally, drivers in operating systems run in user-mode, kernel-mode, or both. UMDs, such as the UMD 110, run in the non-privileged processor mode in which other application code, including protected subsystem code, executes. UMDs cannot gain access to system data or hardware except by calling an API which, in turn, calls system services. KMDs, such as the KMD 112 run as part of the operating system and support one or more protected subsystems. UMDs and KMDs have different structures, different entry points, and different system interfaces. KMDs are able to perform certain protected operations and are able to access system structures that UMDs cannot access. In one example, draw call commands corresponding to primitives generated by an application are recorded onto one or more command buffers 114 by the UMD 110, and the KMD 112 submits draw call commands to the GPU 102 for the subsequent rendering of the primitives. The command processors 122 cause image data to be rendered in accordance with a particular render mode, such as the two-level binning mode or a non-two-level binning mode such as the PBB rendering mode. In some embodiments, the command processors 122 execute low priority and medium priority workloads in the two-level binning mode and execute high priority workloads based on performance heuristics. In some embodiments, the command processors 122 select which render mode to use to render image data associated with a particular high priority workload by determining whether the two-level binning mode is enabled or disabled. In some embodiments, the command processors 122 determine whether the two-level binning mode is enabled or disabled by checking one or more status bits stored in the GPU memory 124 or the system memory 106.

In some embodiments, the CPU 104 enables or disables the two-level binning mode (e.g., for high priority workloads) based on performance data that includes performance counter data received from performance counters 116 stored at the system memory 106, sensor data 118 stored at the system memory 106 by sensors 108, or both. In some embodiments, the UMD 110 or the KMD 112 of the CPU 104 receives the performance data and processes the performance data to determine whether to enable or disable the two-level binning mode (e.g., for high priority workloads).

In some embodiments, the sensor data 118 generated by the sensors 108 includes one or more temperature measurements, voltage measurements, current measurements, instantaneous power measurements, peak power measurements, or other applicable sensor data. In some embodiments, the sensors 108 include one or more temperature sensors, current sensors, voltage sensors, or power sensors.

In some embodiments, the performance counters 116 track activity at various modules of the device, such as the battery 111, the CPU 104, the ring buffer 120, a level one (L1) cache, a level two (L2) cache, or shaders of the GPU 102. In some embodiments, the performance counter data includes one or more respective quantities of cache accesses, cache hit rates, cache miss rates, memory accesses, utilization rate of the GPU 102, utilization rate of the CPU 104, electric current supplied to the GPU 102, electric current supplied to the CPU 104, voltage at the GPU 102, voltage at the CPU 104, frequency of the GPU 102, and/or frequency of the CPU 104.

In some embodiments, the performance data includes one or more parameters that are derived from sensor data 118 or performance counter data generated by the performance counters 116, such as the average temperature of the device 100, the rate of change (RoC) of the average temperature of the device 100, the peak instantaneous power consumption of the device 100 over a given time period, the average power consumption of the device 100 over a given time period, the RoC of the average power consumption of the device 100, or the state of charge (SoC) of the battery 111 (i.e., the remaining charge of the battery 111 expressed as a percentage of the charge capacity of the battery 111). Herein, the "average temperature" of the device 100, refers to a mean, median, or mode of instantaneous temperatures measured at various locations of the device (e.g., at the CPU 104, at the GPU 102, at the battery 111, or a combination of these), a mean, median or mode of temperatures measured at the various locations of the device over a defined time period, a mean, median, or mode of estimated temperatures of the device 100 derived from estimated power consumption based on performance counter data generated by the performance counters 116 over a defined time period, according to various embodiments. Herein, the "average power consumption" of the device 100, refers to a mean, median, or mode of instantaneous power consumption measured at the battery 111 over a defined time period or a mean, median, or mode of estimated instantaneous power consumption based on performance counter data generated by the performance counters 116 over a defined time period, according to various embodiments.

The UMD 110 or the KMD 112 monitors the performance data to determine whether one or more pre-defined conditions for enabling the two-level binning mode (e.g., for high priority workloads), sometimes referred to herein as "two-level binning conditions", have occurred. In some embodiments, enabling or disabling the two-level binning mode involves the UMD 110 or the KMD 112 setting values of one or more status bits in the system memory 106 or the GPU 102 that are indicative of whether the two-level binning mode is enabled (e.g., for high priority workloads). In some embodiments, the two-level binning conditions include one or more of: the average temperature of the device exceeding a predefined temperature threshold, the RoC of the average temperature of the device exceeding a predefined RoC threshold, the local temperature at a defined location of the device exceeding a predefined temperature threshold, the RoC of such a local temperature exceeding a predefined RoC threshold, the peak instantaneous power consumption of the device exceeding a predefined threshold, the average power consumption of the device exceeding a predefined threshold, the RoC of the average power consumption of the device exceeding a predefined threshold, the battery SoC falling below a predefined SoC threshold, or a combination of these conditions. It should be understood that, in some embodiments, after a two-level binning condition is met and the two-level binning mode is enabled by the UMD 110 or the KMD 112, if that two-level binning condition is subsequently determined to no longer be met based on changes in the performance data, the device will disable the two-level binning mode (e.g., for high priority workloads). However, in some embodiments, other detectable conditions, sometimes referred to herein as "override conditions", override the detection of two-level binning conditions. For example, if the device 100 is determined by the UMD 110 or the KMD 112 to meet a two-level binning condition, but is also determined to meet an override condition of being plugged in (e.g., if the battery is determined to be in a "charging" state), then the two-level binning mode is disabled (e.g., for high priority workloads). In some embodiments, alternative or additional override conditions are set, such as determining that the average power consumption of the device 100 drops below a threshold or determining that the GPU 102 or the CPU 104 is no longer being thermally throttled (e.g., determinable based on a clock frequency of the GPU 102 or the CPU 104 increasing above a threshold).

In some embodiments, when recording workloads to the command buffer(s) 114, the UMD 110 will record a given workload (e.g., a high priority workload) in the command buffer 114 differently depending on whether the two-level binning mode is enabled or disabled based on the corresponding status bits stored in the system memory 106. In some embodiments, upon enabling the two-level binning mode, the UMD 110 records all subsequent high priority workloads to the command buffer(s) 114 to be executable according to the two-level binning mode, at least until the two-level binning mode is disabled again. In some embodiments, upon disabling the two-level binning mode, the UMD 110 records all subsequent high priority workloads in the command buffer(s) 114 to be executable according to a non-two-level or single-level binning mode such as the single-level PBB mode. In some embodiments, the UMD 110 or the KMD 112 individually determines the binning mode for each high priority workload stored in a given command buffer 114 based on whether two-level binning mode is enabled at the time that high priority workload is recorded by the UMD 110, and, in some instances, based on whether a given high priority workload is able to be executed in the two-level binning mode.

For example, in some embodiments, the UMD 110 is configured to record high priority workloads to the command buffer(s) 114 in the one-level binning mode by default and is configured to modify one or more pending high priority workloads of the command buffers 114 to be executed in the two-level binning mode prior to submission to the GPU 102 when two-level binning conditions are met. In other embodiments, the UMD 110 is configured to record all applicable workloads to command buffers 114 in the two-level binning mode by default and is configured to modify one or more pending high priority workloads in the command buffers 114 to be executed in the one-level binning mode prior to their submission to the GPU 102 when two-level binning conditions are not met.

In some cases, the state of the two-level binning mode (i.e., enabled/disabled) changes after the UMD 110 has already recorded or has begun to record one or more high priority workloads in the command buffers 114, referred to in such instances as "pending workloads", but before the pending workloads have been executed by the GPU 102. In some embodiments, such pending high priority workloads are modified via command buffer patching to be executed in accordance with the two-level binning mode or the non-two-level binning mode, depending on whether the two-level binning mode is enabled. Herein, command buffer patching refers to the modification of the data (e.g., workloads, commands) within a command buffer by a driver or other module executed by the CPU 104 or the GPU 102 and is performed at either the CPU 104 or at the GPU 102.

In one example, a pending high priority workload in the command buffer(s) 114 that was recorded while the two-level binning mode was enabled is modified by the CPU 104 or the GPU 102 via command buffer patching to execute in accordance with the non-two-level binning mode, responsive to a determination by the CPU 104 or the GPU 102 that the two-level binning mode has been disabled since the initiation of recording the pending high priority workload. As another example, a pending high priority workload in the command buffer(s) 114 that was recorded while the two-level binning mode was disabled is modified by the CPU 104 or the GPU 102 via command buffer patching to execute in accordance with the two-level binning mode, responsive to a determination by the CPU 104 or the GPU 102 that the two-level binning mode has been enabled since the initiation of recording the pending high priority workload. Generally, once the GPU 102 has begun executing at least part of a given workload, that workload cannot be patched to change its binning mode.

For some embodiments in which command buffer patching is performed at the CPU 104, the UMD 110 or the KMD 112 performs command buffer patching near the end of the command buffer recording process. In some embodiments, when command buffer patching is performed at the CPU 104, the UMD performs command buffer patching immediately prior to submitting the patched high priority workloads from the command buffer(s) 114 to the GPU 102, excluding instances when the pending high priority workload in the command buffer 114 is configured to be executed more than once simultaneously (a pre-defined condition, which would be known at the time of recording the workload to the command buffer 114).

In some embodiments involving CPU-side command buffer patching, the UMD 110 stores metadata for each high priority workload. In some embodiments, the metadata stored for each high priority workload includes one or more tokens and one or more offsets. Each offset defines a location in the command buffer 114 that will need to be modified if the two-level-binning mode is enabled. Each token defines how the code stored in the command buffer 114 at the location defined in a corresponding offset should be modified if the two-level-binning mode is enabled. In one example, a token of the metadata causes the UMD 110 to modify code in the command buffer 114 that describes the visibility of primitives. In some embodiments, command buffer patching is only required when the two-level binning mode is enabled, and the UMD 110 initially (i.e., by default) records each high priority workload to the command buffer 114 to execute in the non-two-level binning mode in such embodiments before making a determination whether to patch the command buffer 114 to be executable in the two-level binning mode at the end of the recording process or immediately before submitting the workload(s) stored on the command buffer(s) 114 to the GPU 102. As indicated above, in some embodiments the UMD 110 alternatively records each workload to the command buffer(s) 114 to execute in the two-level binning mode, at least for those workloads that are capable of being executed in the two-level binning mode and then determines whether to modify one or more high priority workloads of those workloads to instead execute in the non-two-level binning mode based on whether the two-level binning mode is enabled, and, in some instances, whether predefined override conditions are met.

In some embodiments, command buffer patching is performed at the GPU 102 based on a value or a group of values, referred to herein as "patch enable values", which are stored in GPU memory 124 or a unified memory that is shared between the GPU 102 and the CPU 104, such as the system memory 106. In some embodiments, each patch enable value is a single Boolean value corresponding to a respective pending high priority workload in the command buffer(s) 114. In some embodiments, the KMD 112 determines whether the two-level binning mode is enabled based on the corresponding status bits stored in the system memory 106 or based on analysis of the performance data, then the KMD 112 causes the patch enable values to be set according to whether the two-level binning mode is enabled prior to execution of the command buffer 114 by the GPU 102. For some embodiments in which GPU-side patching is performed, the UMD 110 must record the high priority workloads to the command buffer(s) 114 to be executable in both the two-level binning mode both the non-two-level binning mode, and the command processor(s) 122 determine(s) which mode to execute the high priority workloads in based on the corresponding patch enable value(s).

In some embodiments, the patch enable values are instead command-buffer-based patch enable values that are stored on the command buffers 114 by the UMD 110 during recording. In one example, the GPU 102, when executing a given high priority workload, checks one or more patch enable values for that workload, the patch enable values having been stored with the high priority workload in the command buffer(s) 114. In such embodiments, the GPU 102 modifies one or more high priority workloads stored in the command buffer 114 to be executable in the two-level binning mode or the non-two-level binning mode based on the command-buffer-based patch enable values when executed by the GPU 102. In one example, a command processor of the GPU 102 or a shader core of the GPU 102 modifies the high priority workload to execute in either the two-level binning mode or a non-two-level binning mode based on the determination of whether GPU-side patching is needed. In some embodiments, the need for GPU-side patching is determined based on patch enable bits stored at the GPU memory 124 or status bits stored at the system memory 106, as described previously.

Figure 2:
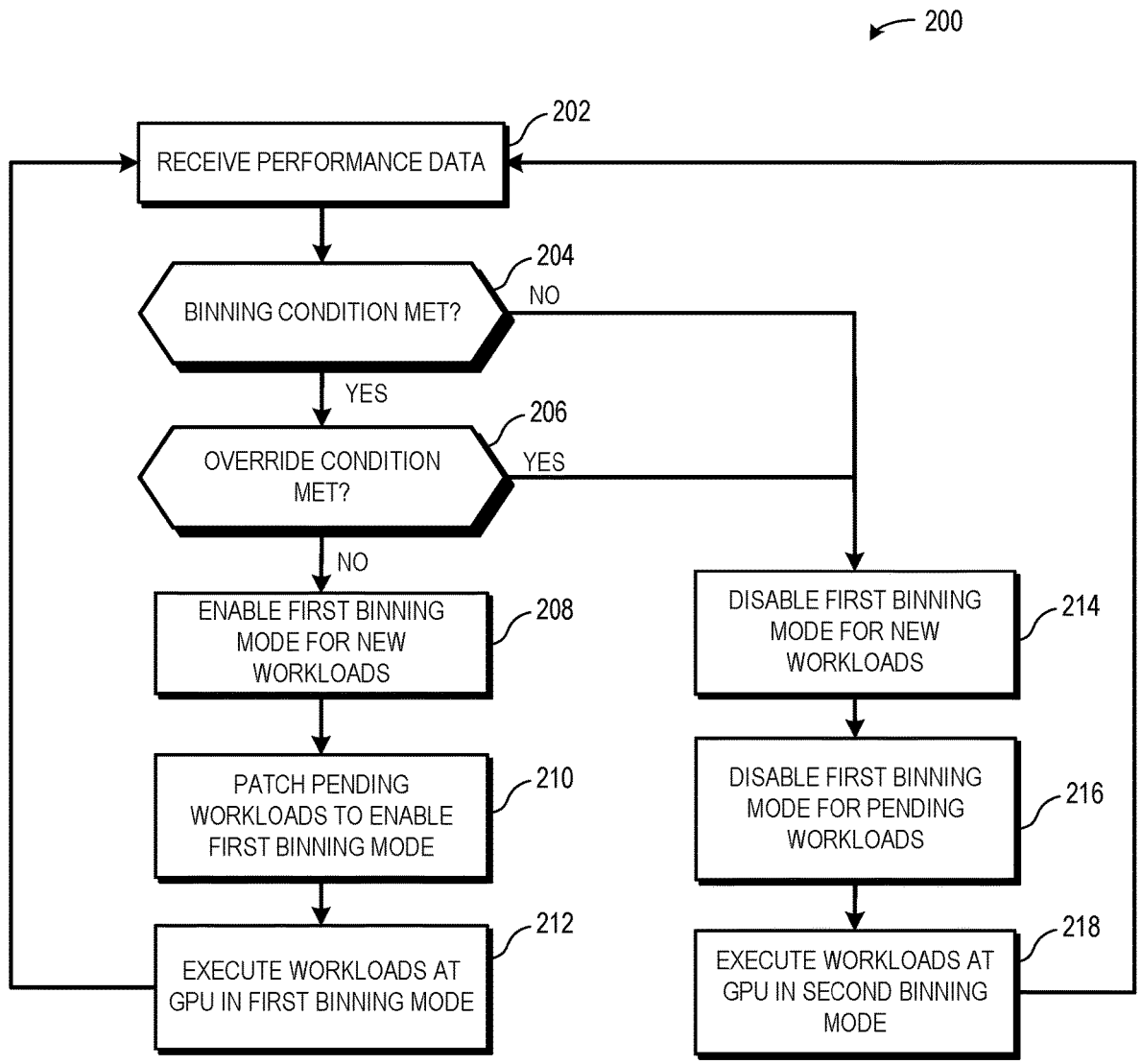
FIG. 2 is a flow diagram illustrating a method for setting a binning mode for GPU workloads based on performance heuristics, in accordance with some embodiments.

FIG. 2 shows an illustrative process flow for a method 200 of selectively executing workloads (e.g., high priority workloads) in one or more command buffers in a first binning mode or in a second binning mode based on performance data generated by performance counters or sensors. In some embodiments, the first binning mode is a two-level binning mode and the second binning mode is a single-level binning mode such as a PBB mode. The method 200 is described with respect to an example implementation at the device 100 of FIG. 1 and its constituent components and modules.

At block 202, the UMD 110 or the KMD 112 (e.g., being executed by the CPU 104) retrieves or otherwise receives performance data. In some embodiments, the performance data includes sensor data 118 generated by the sensors 108. In some embodiments, the performance data includes performance counter data generated by the performance counters 116. In some embodiments, the performance data includes both the performance counter data and the sensor data 118. In some embodiments, the sensor data 118 generated by the sensors 108 includes one or more temperature measurements, voltage measurements, current measurements, instantaneous power measurements, peak power measurements, or other applicable sensor data. In some embodiments, the performance data includes one or more respective quantities of cache accesses, cache hit rates, cache miss rates, memory accesses, utilization rate of the GPU 102, utilization rate of the CPU 104, electric current supplied to the GPU 102, electric current supplied to the CPU 104, voltage at the GPU 102, voltage at the CPU 104, frequency of the GPU 102, and/or frequency of the CPU 104, each corresponding to activity occurring at one or more modules of the device 100 such as the battery 111, the CPU 104, the ring buffer 120, a level one (L1) cache, a level two (L2) cache, or shaders of the GPU 102. In some embodiments, the performance data includes one or more parameters that are derived from sensor data 118 or performance counter data generated by the performance counters 116, such as the average temperature of the device, the rate of change (RoC) of the average temperature of the device, the peak instantaneous power consumption of the device during a given time period, the average power consumption of the device over a given time period, the RoC of the average power consumption of the device, or the state of charge (SoC) of the battery (i.e., the remaining charge of the battery, which in some embodiments is expressed as a percentage of the charge capacity of the battery). In some embodiments, the performance characteristics for a given workload include workload characteristics for that workload that are indicative of whether the workload is applicable for execution in the two-level binning mode. For example, such workload characteristics include use of tessellated draw calls, atomics in shaders, read-modify-write of buffers in shaders, or stream-out in the workload. In some embodiments, the derived parameters are calculated by the UMD 110 or the KMD 112.

At block 204, the UMD 110 or the KMD 112 determines whether a binning condition (e.g., a two-level binning condition) has been met based on the performance data. For example, in some embodiments, the binning condition includes one or more two-level binning conditions including one or more of: the average temperature of the device exceeding a predefined temperature threshold, the RoC of the average temperature of the device exceeding a predefined RoC threshold, the local temperature at a defined location of the device exceeding a predefined temperature threshold, the RoC of such a local temperature exceeding a predefined RoC threshold, the peak instantaneous power consumption of the device exceeding a predefined threshold, the average power consumption of the device exceeding a predefined threshold, the RoC of the average power consumption of the device exceeding a predefined threshold, the battery SoC falling below a predefined SoC threshold, or a combination of these conditions. If the UMD 110 or the KMD 112 determines that a binning condition has been met, the method 200 proceeds to block 206. Otherwise, if the UMD 110 or the KMD 112 determines that a binning condition has not been met, the method 200 proceeds to block 214.

At block 206, the UMD 110 or the KMD 112 determines whether an override condition has been met based on the performance data. In some embodiments, the override conditions include one or more of: the device 100 entering a charging condition in which the battery 111 is being charged, the average temperature of the device 100 falling below a predetermined threshold, the RoC of the average temperature of the device 100 falling below a predetermined threshold, or a combination of these. In some embodiments, one or more override conditions are determined based on workload characteristics for a given workload that are indicative of whether the workload is applicable for execution in the two-level binning mode. In one example, an override condition is triggered in response to determining, based on workload characteristics, that a given workload includes the use of one or more of: tessellated draw calls, atomics in shaders, read-modify-write of buffers in shaders, or stream-out in the workload. If the UMD 110 or the KMD 112 determines that the override condition has not been met, the method 200 proceeds to block 208. Otherwise, if the UMD 110 or the KMD 112 determines that the override condition has been met, the method 200 proceeds to block 214.

At block 208, the UMD 110 or the KMD 112 enables a first binning mode for newly created high priority workloads that are to be stored at the command buffer(s) 114. In some embodiments, the first binning mode is the two-level binning mode. For example, to enable the first binning mode, the UMD 110 or the KMD 112 sets status bit values in the system memory 106 to indicate that the first binning mode is enabled for high priority workloads. In some embodiments, when recording subsequent high priority workloads in the command buffer(s) 114, the UMD 110 checks the status bit values and determines that high priority workloads should be configured to execute in the first binning mode. In some embodiments, the first binning mode is enabled for low priority or medium priority workloads by default (e.g., enabled automatically, but not in response to a binning condition being met and the override condition not being met).

At block 210, the CPU 104 or the GPU 102 patches pending high priority workloads in the command buffer(s) 114 to enable execution of those high priority workloads in the first binning mode. In some embodiments, the UMD 110 patches such high priority workloads via the CPU 104 as they are being recorded to the command buffer 114, such that the patched workloads are configured to be executed in the first binning mode upon being recorded. In some embodiments, the UMD 110 patches pending workloads via the CPU 104 to execute in the first binning mode after the pending high priority workloads have already been recorded in the command buffer(s) 114 and before (e.g., up to immediately before) the pending high priority workloads are provided from the command buffer(s) 114 to the GPU 102. In some embodiments, the GPU 102 patches the pending high priority workloads to execute in the first binning mode prior to (e.g., immediately prior to) execution of the pending high priority workloads based on one or more patch enable values stored in the GPU memory 124.

At block 212, the high priority workloads are executed at the GPU 102 in the first binning mode (e.g., for as long as one or more binning conditions are met and the override conditions are not met). In some embodiments, execution of such high priority workloads preempts execution of lower priority workloads.

At block 214, the UMD 110 or the KMD 112 disables the first binning mode for newly created high priority workloads that are to be stored in the command buffer(s) 114. For example, to disable the first binning mode, the UMD 110 or the KMD 112 sets status bit values in the system memory 106 to indicate that the first binning mode is disabled for high priority workloads. In some embodiments, responsive to detecting that no binning condition is met at block 204, when recording high priority workloads in command buffer(s) 114, the UMD 110 checks the status bit values and determines that, where applicable, the high priority workloads should be configured to execute in a second binning mode. In some embodiments, the second binning mode is a single-level binning mode such as the PBB mode. In some embodiments, the system causes the first binning mode to remain enabled for low priority and medium priority workloads.

At block 216, UMD 110 or the KMD 112 disables the first binning mode for pending high priority workloads that are already stored in the command buffer(s) 114. For embodiments in which the UMD 110 records high priority workloads in the command buffers 114 to be executed in the second binning mode by default, block 216 is skipped, as no further action beyond modifying the status bits at block 214 is required to disable the first binning mode for the high priority workloads. For some embodiments in which GPU-side patching is performed, the KMD 112 disables the first binning mode for pending high priority workloads in the command buffers 114 by setting one or more patch enable values in the GPU memory 124 to indicate that the first binning mode is disabled.

At block 218, the high priority workloads are executed at the GPU 102 in the second binning mode (e.g., for as no binning conditions are met or at least one override condition is met). In some embodiments, execution of such high priority workloads preempts execution of lower priority workloads.

Figure 3:
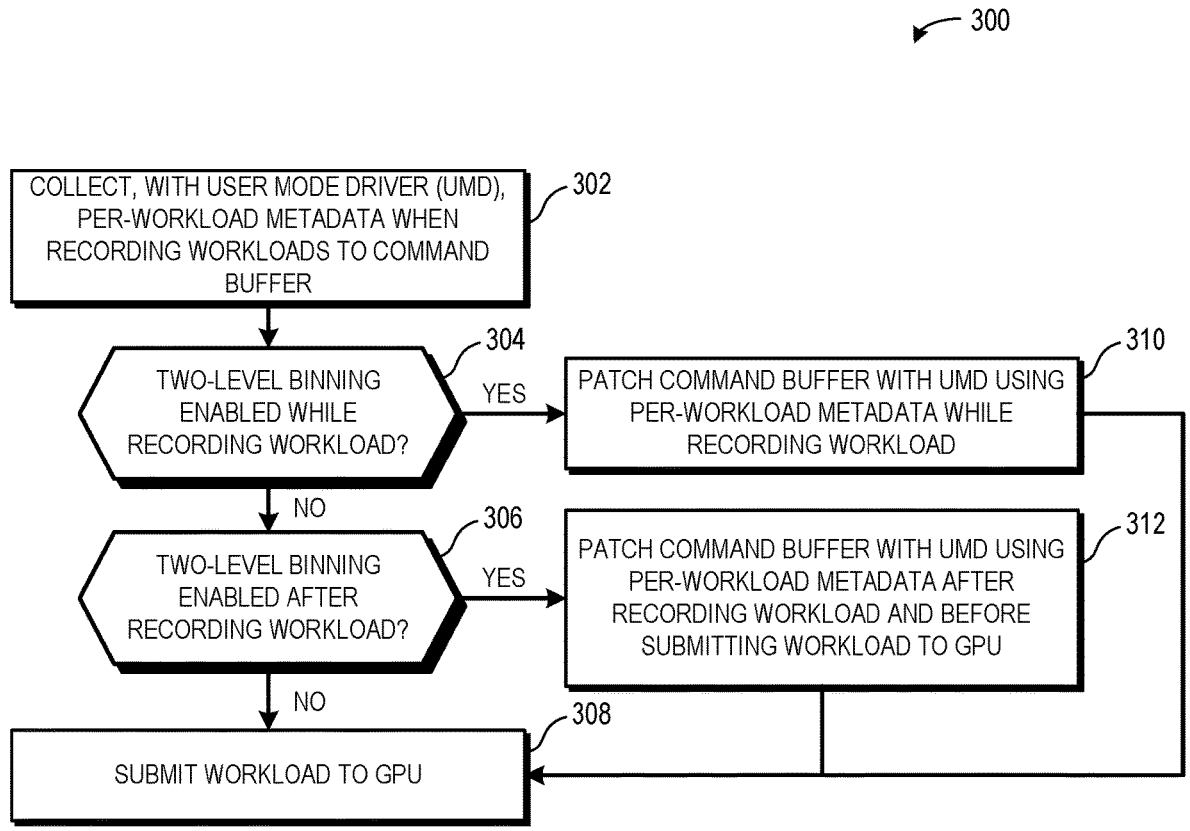
FIG. 3 is a flow diagram illustrating a method for selective patching a pending workload prior to submitting the command to the GPU based on a determined binning mode, in accordance with some embodiments.

FIG. 3 shows an illustrative process flow for a method 300 of selectively patching command buffers at a CPU to be executable in a two-level binning mode or in a non-two-level binning mode. The method 300 is described with respect to an example implementation at the device 100 of FIG. 1 and its constituent components and modules. In some embodiments, one or more steps of the method 300 are performed in conjunction with block 210 of FIG. 2.

At block 302, the UMD 110 collects metadata for each high priority workload (i.e., "per-workload metadata") of a given command buffer 114 when recording the high priority workloads in the command buffer 114. In some embodiments, the metadata stored for each high priority workload includes one or more tokens and one or more offsets. Each offset defines a location in the command buffer 114 that will need to be modified if the two-level-binning mode is enabled in order to execute a corresponding high priority workload of the command buffer 114. Each token defines how the code of the command buffer 114 at the location defined in a corresponding offset should be modified if the two-level-binning mode is enabled. In one example, a token of the metadata causes the UMD 110 to modify code that describes the visibility of primitives of a given high priority workload if the two-level binning mode is enabled, where the code is included in the high priority workload itself or is stored in the command buffer(s) 114 in association with the high priority workload.

At block 304, the UMD 110 determines whether the two-level binning mode is enabled at or near the end of the recording process for a given high priority workload being recorded to the command buffer 114. In some embodiments, the UMD 110 checks the value of one or more status bits stored in the system memory 106 to determine whether the two-level binning mode is enabled. If the two-level binning mode is determined to be enabled, the method proceeds to block 310. If the two-level binning mode is determined to be disabled, the method 300 proceeds to block 306.

At block 306, the UMD 110 determines whether the two-level binning mode is enabled after recording the high priority workload to the command buffer 114 and prior to (e.g., immediately prior to) submitting the high priority workload from the command buffer 114 to the GPU 102. In some embodiments, the UMD 110 checks the value of one or more status bits stored in the system memory 106 to determine whether the two-level binning mode is enabled. If the two-level binning mode is determined to be enabled, the method proceeds to block 312. If the two-level binning mode is determined to be disabled, the method 300 proceeds to block 308.

At block 308, a scheduler (e.g., implemented via the CPU 104 via the KMD 112 or implemented via the GPU 102 via firmware) submits the high priority workload from the command buffer 114 to the GPU 102.

At block 310, the UMD 110 patches the command buffer 114 to configure the high priority workload to be executable in the two-level binning mode based on the per-workload metadata while the high priority workload is being recorded to the command buffer 114 (e.g., near the end of the recording process). Generally, the way in which the command buffer 114 is patched by the UMD 110 depends on the hardware implementation of the device 100.

In one example, two-level binning inherently uses visibility information in a buffer (i.e., a "visibility information buffer") as a basis for determining which primitives are visible in which bin. In the present example, the UMD 110 records the high priority workload to the command buffer 114 to be executed using one-level binning, the UMD does not include a command for the GPU to bind such a visibility information buffer, whereas the high priority workload would need to include such a command if the high priority workload were recorded by the UMD 110 to be executed using two-level binning. The UMD 110, therefore, generates metadata including a token and an offset that indicate the location in the command buffer 114 where the command to bind the visibility information buffer would need to be included for the high priority workload if executed in the two-level binning mode. In this way, when the two-level binning mode is enabled prior to submitting a high priority workload from the command buffer 114 to the GPU 102, the UMD 110 or the KMD 112 patches the high priority workload to include the command to bind the visibility information buffer at the location indicated in the metadata.

In another example, the GPU 102 generally needs to receive bin information indicating how many bins exist, the size of those bins, and/or the order in which the bins should be processed if executing in the two-level binning mode. In the present example, the UMD 110 generates metadata for each high priority workload recorded in a command buffer 114 that includes binning information indicative of the number of bins, the size of each bin, and the order in which the bins should be processed, where the binning information is needed to execute that high priority workload in the two-level binning mode. In this way, when the two-level binning mode is enabled prior to submitting the high priority workload to the command buffer 114 to the GPU 102, the UMD 110 or the KMD 112 patches the high priority workload of the command buffer 114 to include the binning information indicated in the metadata.

At block 312, the UMD patches the command buffer 114 configure the high priority workload stored on the command buffer 114 to be executable in the two-level binning mode based on the per-workload metadata after recording the high priority workload to command buffer 114 and before submitting the high priority workload from the command buffer 114 to the GPU 102.

Figure 4:
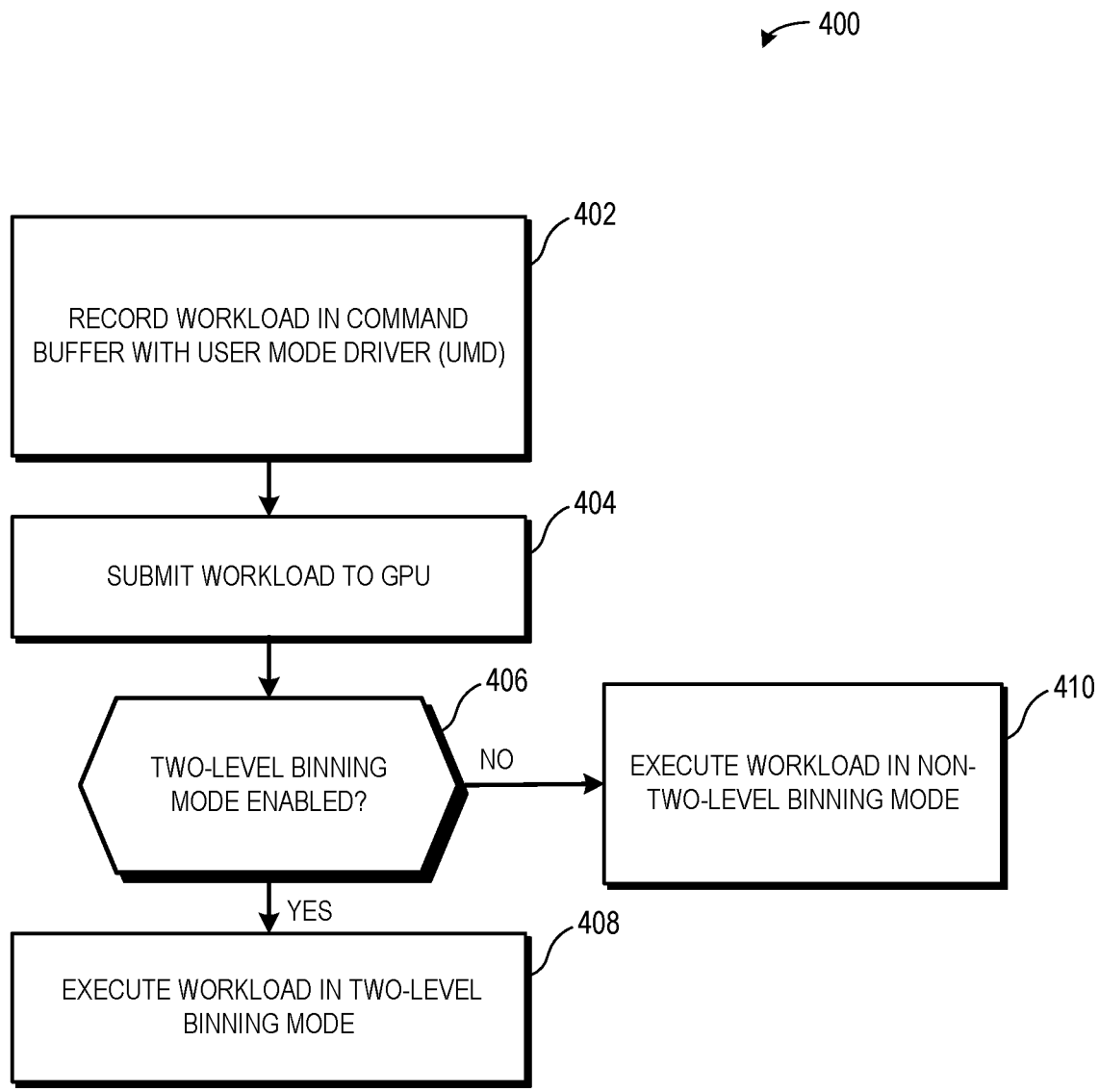
FIG. 4 is a flow diagram illustrating a method for selective execution of workloads in a two-level binning mode or a non-two-level binning mode, in accordance with some embodiments.

FIG. 4 shows an illustrative process flow for a method 400 of selectively executing workloads of command buffers at a GPU to in a two-level binning mode or in a non-two-level binning mode. In some embodiments, the GPU performs command buffer patching of the command buffers to make the workloads executable in either the two-level binning mode or the non-two-level binning mode based on corresponding metadata generated by a UMD. The method 400 is described with respect to an example implementation at the device 100 of FIG. 1 and its constituent components and modules. In some embodiments, one or more steps of the method 400 are performed in conjunction with the method 200 of FIG. 2.

At block 402, the UMD 110 records a workload to the command buffer 114. In some embodiments, the UMD 110 configures recorded workloads to be executable in either of the two-level binning mode or the non-two-level binning mode without patching. In some other embodiments, the UMD 110 configures recorded high priority workloads to be executed in the non-two-level binning mode by default, and generates metadata that allows the GPU 102 to modify the recorded workloads to be executed in the two-level binning mode, if required (i.e., if the two-level binning mode is enabled after the high priority workloads are recorded in the command buffer 114 and before their execution by the GPU 102). In some embodiments, the UMD 110 configures recorded low priority and medium priority workloads to be executed in the two-level binning mode by default.

In one example, the UMD 110 records a conditional statement for one or more high priority workloads in the command buffer 114, where the conditional statement causes the GPU 102 to check a patch enable value stored at a register in the GPU memory 124 and execute each high priority workload in the command buffer 114 in a two-level binning mode or a non-two-level binning mode depending on the value of the patch enable value. In some embodiments, the patch enable value is a Boolean value stored in a single bit of the register in the GPU memory 124. In some embodiments, the patch enable value is set by the UMD 110 or the KMD 112.

At block 404, the KMD 112 submits the workload from the command buffer 114 to the GPU 102. In some embodiments, upon submission to the GPU 102, the workload is added to the ring buffer 120.

At block 406, the GPU 102 determines whether the two-level binning mode is enabled for the submitted workload. In some embodiments, the GPU 102 checks one or more patch enable values stored at the GPU memory 124 to determine whether the two-level binning mode is enabled for high priority workloads. In some embodiments, the KMD 112 determines whether the two-level binning mode is enabled for a submitted high priority workload based on corresponding performance data and sets the patch enable values in the GPU memory 124 accordingly. If the GPU 102 determines that the two-level binning mode is enabled for the submitted workload, the method 400 proceeds to block 408. Otherwise, if the GPU 102 determines that the two-level binning mode is not enabled for the submitted workload, the method 400 proceeds to block 410. In some embodiments, the two-level binning mode is enabled for low priority and medium priority workloads by default, and such workloads are executed in the two-level binning mode based on their priority (e.g., rather than on performance heuristics).

At block 408, the GPU 102 executes the submitted workload in the two-level binning mode. In some embodiments, the GPU 102 utilizes metadata generated by the UMD 110 during recording of the workloads to the command buffer 114, as described above, to patch one or more high priority workloads of the command buffer 114 to execute in the two-level binning mode in response to determining that the patch enable value indicates that those high priority workloads should be executed in the two-level binning mode. In some other embodiments, the UMD 110 records each high priority workload that can possibly be executed in the two-level binning mode to be executable in either the two-level binning mode or the non-two-level binning mode, and the GPU 102 is configured to execute those high priority workloads in a selected one of the two-level binning mode or the non-two-level binning mode based on the patch enable value.

At block 410, the GPU 102 executes the submitted workload of the command buffer 114 in the non-two-level binning mode. In some embodiments, the non-two-level binning mode is a PBB render mode.

Figure 5:
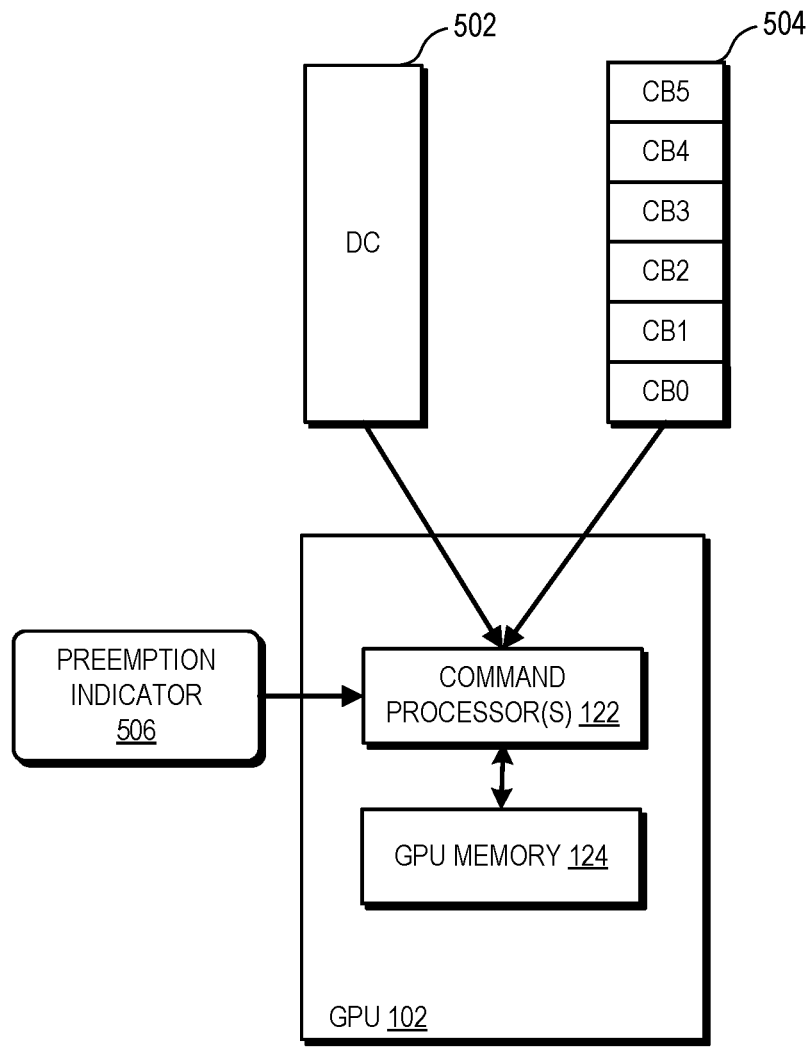
FIG. 5 is a block diagram of high priority and low/medium priority queues for priority-based organization and selection of workloads to be executed by a GPU, in accordance with some embodiments.

FIG. 5 shows an example in which a GPU (an embodiment of the GPU 102 of FIG. 1) is configured to preempt low priority and medium priority workloads in order to execute high priority workloads. The present example is described with respect to an example implementation at the device 100 of FIG. 1 and its constituent components and modules.

In the present example, the command processors 122 of the GPU 102 are configured to receive and execute workloads from a high priority queue 502 (e.g., one of the ring buffers 120) and a low/medium priority queue 504 (e.g., another of the ring buffers 120). For example, each workload stored in the command buffers 114 includes a priority indicator, which designates a priority level for that workload (e.g., high priority, medium priority, low priority, etc.). In some embodiments, the priority indicator for a given workload is determined based on the function of that workload (e.g., all display composition workloads are designated high priority). In the present example, high priority workloads submitted for execution by the GPU 102 are stored in the high priority queue 502, and low priority workloads and medium priority workloads submitted for execution by the GPU 102 are stored in the low/medium priority queue 504.

In some embodiments, the GPU 102 is configured to preempt execution of a low priority workload or a medium priority workload that is being executed by the command processors 122 upon receiving a high priority workload at the high priority queue 502. For example, the command processors preempt execution of workloads from the low/medium priority queue 504 in response to receiving a preemption indicator 506, which indicates that a high priority workload 502 is ready for execution at the high priority queue 502.

Conventionally, since APIs do not typically provide the means to divide a workload into anything finer than full draw calls, preemption of a given low priority or medium priority workload would be delayed by the amount of time it would take the command processors 122 to finish executing a full draw call of the workload being preempted. Herein, a draw call refers to a call to a graphics API, which causes one or more objects (e.g., one or more primitive) to be drawn during rendering. For example, the primitive count of a given draw call is typically specified as part of the draw call command. Such a delay is undesirable or unacceptable, as it potentially results in the GPU 102 failing to timely execute the high priority workload that initiated the preemption of the lower priority workload prior to a specified deadline. Accordingly, it is typically desirable to reduce such delays in order to avoid missing such high priority workload execution deadlines.

For example, in extended reality (XR) applications, such as virtual reality (VR), augmented reality (AR), or mixed reality (MR) applications, workloads for rendering virtual objects in an XR scene are typically assigned a low or medium priority, while periodic reprojection workloads are assigned a high priority. In XR applications, reprojection, sometimes referred to as asynchronous reprojection, is a process by which the system (e.g., headset, wearable display, etc.) running the XR application ensures appropriate display responsiveness to motion of the system, particularly in circumstances where GPU bottlenecking causes reduced framerate and, therefore, perceived input lag or latency. For example, reprojection generates a prediction of what an image frame should look like based on one or more previously rendered image frames and on motion data generated by one or more motion sensors of the system, typically where the motion data is generated after the previous image frames are rendered. Reprojection workloads are typically generated in parallel with regular image rendering workloads. In typical XR applications, at least one reprojection workload is required to be executed for each vertical sync (Vsync) of the GPU to reduce the user's perception of input lag. In order to ensure that a reprojection workload is executed for each Vsync, if the system is executing a lower priority image rendering workload when the reprojection workload is ready to be executed, the system uses draw call preemption to preempt (e.g., temporarily halt) execution of the lower priority image rendering workload and executes the reprojection workload once the lower priority workload has been successfully halted.

As another example, in automotive applications, such as for automotive systems having human machine interface (HMI) displays, navigation displays, and instrument clusters, workloads for rendering HMI and navigation images are typically assigned a low or medium priority, while workloads for rendering instrument cluster images are assigned a high priority. In automotive applications, it is typically required for a vehicle's instrument cluster display to be updated periodically so that the operator of the vehicle has an accurate and up-to-date understanding of the various parameters of the vehicle (e.g., speed, temperature, mileage, rpms, fuel level, etc.) that are indicated via the instrument cluster. In some instances, a minimum refresh rate for the instrument cluster in an automotive system is set according to industry standards, so it is beneficial to ensure that this minimum refresh rate is consistently met by the automotive system. In some embodiments, the instrument cluster display is configured to be updated (e.g., via execution of a corresponding instrument cluster workload) once per Vsync. In order to ensure that a respective instrument cluster workload is executed for each Vsync, if the automotive system is executing a lower priority HMI or navigation workload when the instrument cluster workload is ready to be executed, the automotive system uses draw call preemption to temporarily halt execution of the lower priority workload and executes the instrument cluster workload once the lower priority workload has been successfully halted.

In both the XR and automotive examples provided above, when a draw call preemption occurs, the higher priority workload cannot be executed until after the lower priority workload that was originally being executed has been successfully halted. As indicated above, APIs typically do not provide means for workloads to be broken down into divisions smaller than full draw calls, where a given full draw call must finish executing before the corresponding workload can be successfully halted. However, the more complex a full draw call of a low or medium priority workload is, the more time it takes to execute, leading to unacceptable delays in draw call preemption when attempting to preempt such complex full draw calls. Such delays have the potential to cause the execution of a high priority workload, such as a reprojection workload or an instrument cluster workload, to miss the deadline (e.g., the next Vsync) by which that high priority workload should be executed. In the XR example, this results in the reprojected/predicted image frame being rendered and displayed later than expected, potentially causing motion sickness or disorientation of the user. In the automotive example, this results in unacceptable delays in refreshing the instrument cluster display, potentially causing the automotive system to be out of compliance with associated standards. Accordingly, it is desirable for low and medium priority workloads to be broken down into divisions that are smaller than full draw calls, so that draw call preemption can be performed more quickly. The size of each preemptable division of a given workload is referred to herein as the "preemption granularity". Workloads that are configured for execution in the two-level binning mode have better preemption granularity (e.g., smaller divisions) than those that are executed in a non-two-level binning mode, such as PBB or immediate mode rendering, two-level binning mode workloads are divided into individually executable coarse bins, and halting of workload execution due to draw call preemption can occur upon execution of each coarse bin. Non-two-level binning workloads, such as those configured for PBB or immediate mode rendering, cannot be divided into individually executable parts in this way, since the batches of PBB mode workloads are not independently executable, and immediate mode rendering workloads are not divided into batches or bins. Accordingly, in some embodiments described herein, a system configures low priority and medium priority workloads for execution in the two-level binning mode without consideration for performance heuristics to improve the preemption granularity of such workloads, while selecting the binning mode for high priority workloads based on performance heuristics.

In the present example, the GPU 102 is configured to reduce draw call preemption delays by configuring all applicable low priority and medium priority workloads to be executed in the two-level binning mode to be executed. As indicated previously, workloads that are applicable for execution in the two-level binning mode are those that are functionally capable of being executed in the two-level binning mode. A workload that is configured to be executed in the two-level binning mode is divided into coarse bins, each representing a different region of an image frame to be displayed, for example, with each coarse bin being independently executable by the command processors 122. In contrast to a workload that is not configured for execution in the two-level binning mode, which typically includes full draw calls that require an entire image frame to be rendered when executed, the draw calls of a workload that is configured for execution in the two-level binning mode are broken down into smaller, independently executable coarse bins, such that the entire image frame does not have to be rendered all at once when executing a draw call of a workload in the two-level binning mode. When execution of a low priority or medium priority workload in the two-level binning mode is preempted by a higher priority workload, the command processors 122 do not have to complete rendering of the entire draw call that was being executed when the preemption indicator 506 was received. Rather, the command processors 122 only complete rendering of the coarse bin that was being executed when the preemption indicator 506 was received, which desirably improves preemption granularity, reduces preemption delay, and improves the likelihood that the preempting high priority workload will successfully execute by its specified deadline.

In the present example, the high priority queue 502 includes a high priority workload consisting of a single full draw call command (denoted here as "DC") that, in the present example, is not configured to be executed in the two-level binning mode, while the low/medium priority queue includes a low priority workload consisting of a single draw call command that has been includes multiple coarse bins CB0-CB5 for execution in the two-level binning mode. For example, if the command processors 122 receive the preemption indicator 506 while executing the coarse bin CB3, the command processors 122 will finish executing the coarse bin CB3, and will then begin executing the high priority workload in the high priority queue 502. Once the high priority workload has been executed, the command processors will resume executing the low priority workload by beginning rendering of the next coarse bin CB4. In some embodiments, the quantity of coarse bins into which a given draw call is divided and the size of each coarse bin are automatically or manually adjustable, and by adjusting the quantity and size of the coarse bins, the preemption granularity is also adjusted.

It should be understood that the present example is intended to be illustrative and not limiting. According to various embodiments, each of the high and low/medium priority queues 502 and 504 are respectively capable of including multiple workloads, each with one or multiple draw calls, and draw calls included in the high priority queue 502 are, in some instances, divided into coarse bins for execution in accordance with the two-level binning mode based on performance-based heuristics (e.g., according to one or more of the methods 200, 300, 400 of FIGS. 2, 3, 4).

Figure 6:
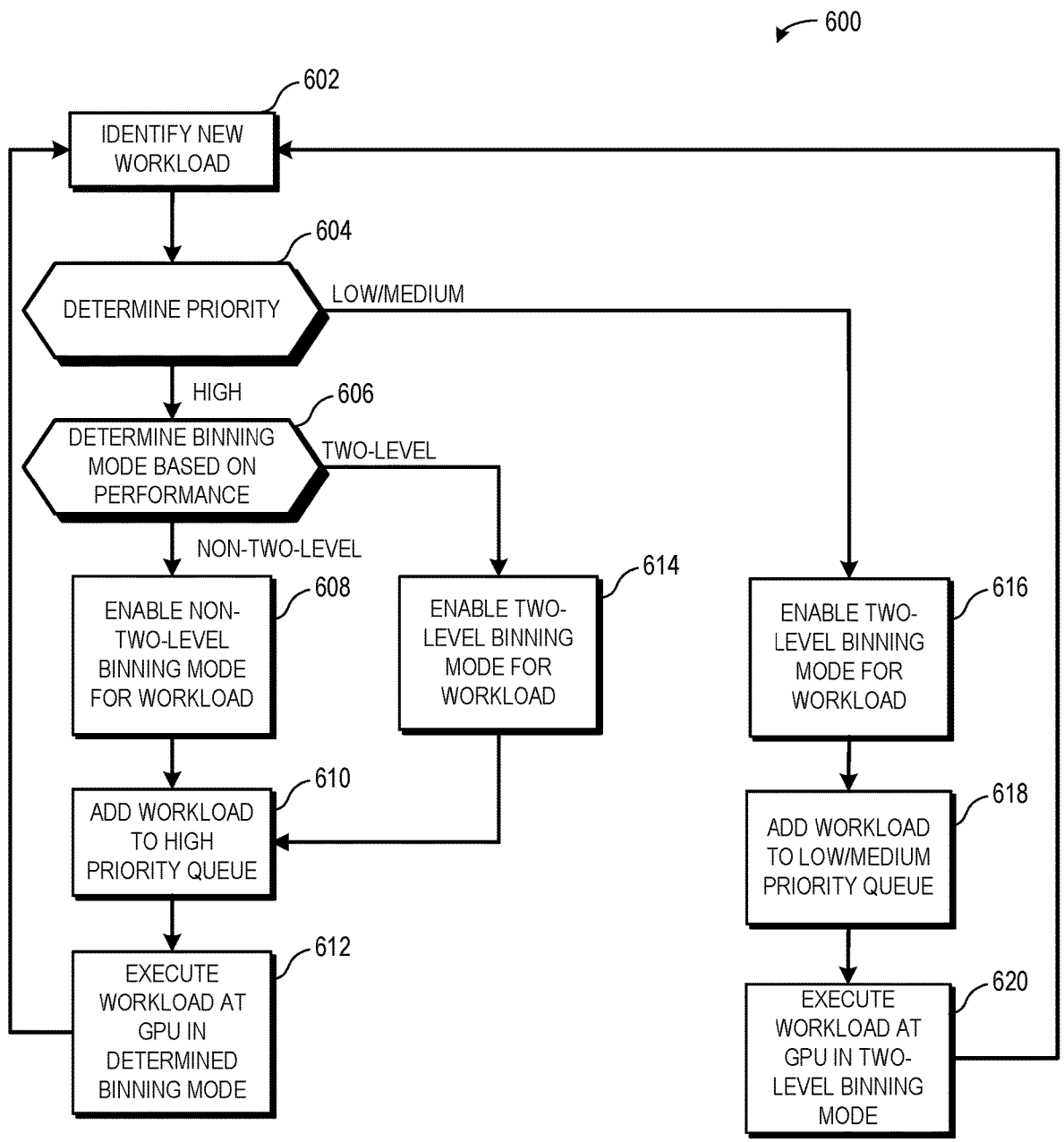
FIG. 6 is a flow diagram illustrating a method of selective execution of workloads in a two-level binning mode or a non-two-level binning mode based on performance heuristics and workload priority, in accordance with some embodiments.

FIG. 6 shows an illustrative process flow for a method 600 of assigning workloads to queues based on their respective priorities and selectively executing the workloads in a two-level binning mode or in a non-two-level binning mode based on their respective priorities and, for high priority workloads, based on performance data generated by performance counters or sensors. The method 600 is described with respect to an example implementation at the device 100 of FIG. 1 and its constituent components and modules and with respect to the example of FIG. 5.

At block 602, the UMD 110 (e.g., being executed by the CPU 104) identifies a new workload that is ready to be recorded in the command buffers 114.

At block 604, the UMD 110 determines the priority of the workload. In some embodiments, each workload includes a priority indicator that designates a priority level for that workload (e.g., high priority, medium priority, or low priority in the present example). Responsive to determining that the workload is a high priority workload, the method 600 proceeds to block 606. Responsive to determining that the workload is a low priority workload or a medium priority workload, the method 600 proceeds to block 614.

At block 606, the UMD 110 determines the binning mode for the high priority workload. In some embodiments, the UMD 110 determines the binning mode for the high priority workload based on whether one or more binning conditions (e.g., two-level binning conditions) have been met, and whether an override condition has been met (e.g., as provided in connection with blocks 204 and 206 of the method 200 of FIG. 2). In some embodiments, the UMD 110 determines whether the binning conditions or override conditions have been met based on performance data, such as the sensor data 118 generated by the sensors 108 or performance counter data generated by the performance counters 116. In some embodiments, the derived parameters are calculated by the UMD 110 or the KMD 112.

For example, responsive to determining that a binning condition has been met and no override condition has been met, the UMD 110 determines that the high priority workload should be configured for execution in the two-level binning mode and the method 600 proceeds to block 614.

For example, responsive to determining that a binning condition has not been met or that a binning condition has been met and an override condition has been met, the UMD 110 determines that the high priority workload should be configured for execution in the non-two-level binning mode and the method 600 proceeds to block 608.

At block 608, the UMD 110 enables the non-two-level binning mode for the high priority workload. In some embodiments, the UMD 110 configures the high priority workload to be executed in the non-two-level binning mode when recording the high priority workload to one of the command buffers 114. In some embodiments, all high priority workloads are configured to be executed in the non-two-level binning mode by default. In some embodiments, the UMD 110 sets one or more patch enable values, status bits, or both to indicate that the high priority workload (and in some instances, all high priority workloads) should be executed in the non-two-level binning mode.

At block 614, the UMD 110 enables the two-level binning mode for the high priority workload. In some embodiments, the UMD 110 configures the high priority workload to be executed in the two-level binning mode when recording the high priority workload to one of the command buffers 114. In some embodiments, the UMD 110 sets one or more patch enable values, status bits, or both to indicate that the high priority workload (and in some instances, all high priority workloads) should be executed in the two-level binning mode.

At block 610, after the UMD 110 has enabled the determined binning mode for the high priority workload, the UMD 110 submits the high priority workload to the GPU 102, and the high priority workload is added to a high priority queue (e.g., an example embodiment of the high priority queue 502 of FIG. 5).

At block 612, the high priority workload is executed at the GPU 102 in the binning mode determined at block 606 (e.g., the two-level binning mode or a non-two-level binning mode). In some embodiments, execution of the high priority workload preempts execution of lower priority workloads.

At block 616, the UMD 110 enables the two-level binning mode for the low priority or medium priority workload. In some embodiments, the UMD 110 configures the low priority or medium priority workload to be executed in the two-level binning mode when recording the low priority or medium priority workload to one of the command buffers 114. In some embodiments, all low priority or medium priority workloads, when applicable (i.e., functionally capable), are automatically configured to execute in the two-level binning mode by default.

At block 618, after the UMD 110 has enabled the two-level binning mode for the low priority or medium priority workload, the UMD 110 submits the low priority or medium priority workload to the GPU 102, and the low priority or medium priority workload is added to a low/medium priority queue (e.g., an example embodiment of the high priority queue 502 of FIG. 5).

At block 620, the low priority or medium priority workload is executed at the GPU 102 in the two-level binning mode. In some embodiments, execution of the low priority or medium priority workload is temporarily halted (e.g., via draw call preemption) to allow one or more high priority workloads to be executed at the GPU 102.

Figure 7:
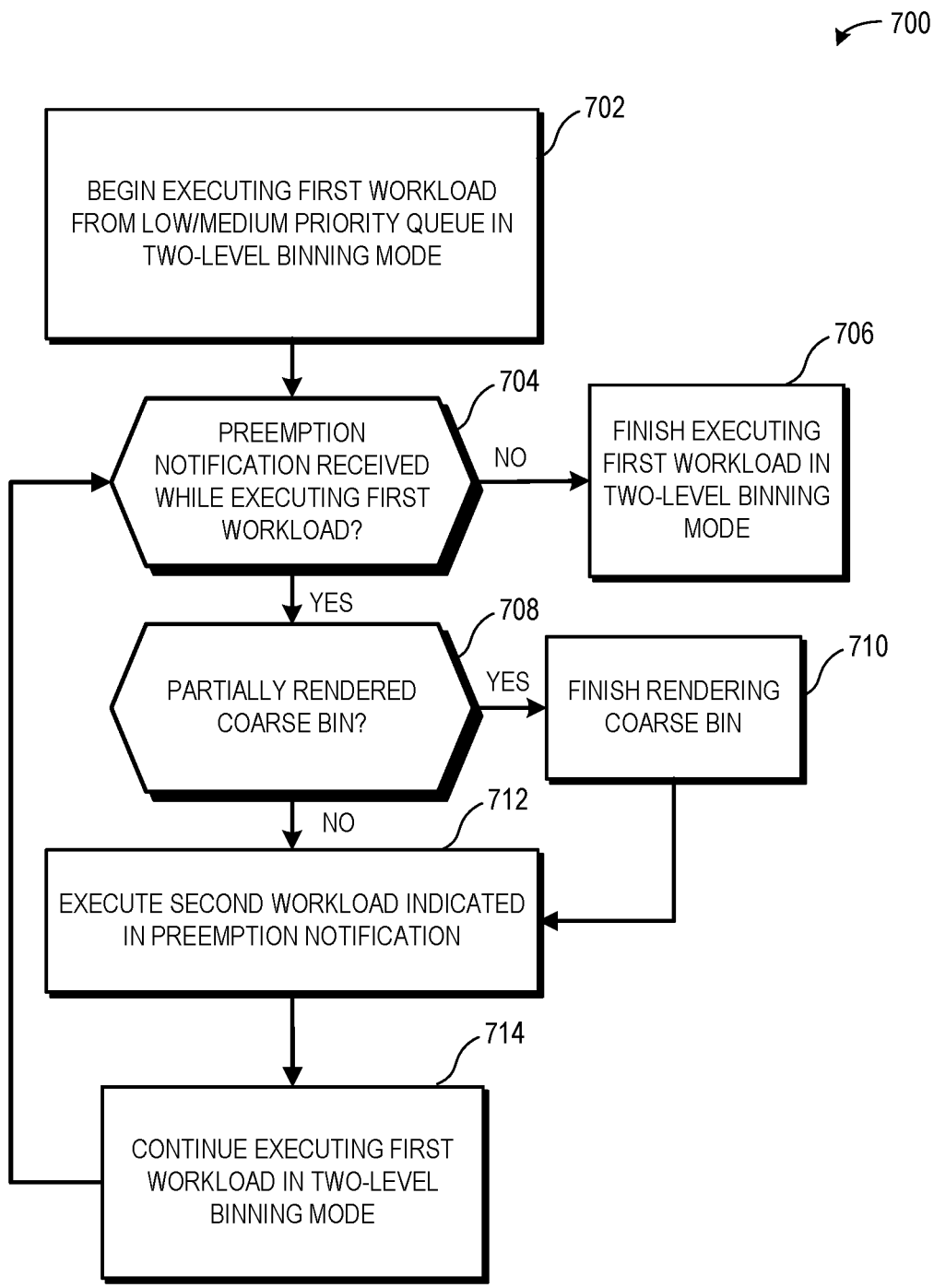
FIG. 7 is a flow diagram illustrating a method of preempting execution of a lower priority workload in a two-level binning mode in order to execute a higher priority workload, in accordance with some embodiments.

FIG. 7 shows an illustrative process flow for a method 700 of preempting, at a GPU, execution of a lower priority workload (e.g., a low priority or medium priority workload) in a two-level binning mode from a low/medium priority queue in order to execute a high priority workload from a high priority queue. The method 700 is described with respect to an example implementation at the device 100 of FIG. 1 and its constituent components and modules and with respect to the example of FIG. 5.

At block 702, the command processor(s) 122 of the GPU 102 begin executing a first workload (i.e., a low priority or medium priority workload) from the low/medium priority queue 504 in the two-level binning mode. For example, each full draw call of the first workload is divided into multiple coarse bins, with each of the coarse bins of a given draw call representing a respectively different region of the image frame being rendered via the draw call and each of the coarse bins being individually executable.

At block 704, while executing the first workload, the GPU 102 continuously or periodically determines whether a preemption notification, such as the preemption notification 506, has been received by the GPU 102. In some embodiments, a scheduler (e.g., implemented via a driver such as the UMD 110 or KMD 112 at the CPU 104 or via firmware at the GPU 102) sends the preemption notification to the GPU 102 in response to determining that a high priority workload has been submitted to the high priority queue 502. If no preemption notification is received by the GPU 102 while continuing to execute the first workload, the method 700 proceeds to block 706 at which the GPU 102 finishes execution of the first workload in the two-level binning mode. If a preemption notification is received by the GPU 102 while executing the first workload, the method 700 proceeds to block 708.

At block 708, the GPU 102 determines whether, at the time the preemption notification was received while executing the first workload, a coarse bin of the first workload was only partially rendered (e.g., the preemption notification was received while the GPU 102 was rendering the coarse bin). In response to the GPU 102 identifying a partially rendered coarse bin, the method 700 proceeds to block 708. Otherwise, the method 700 proceeds to block 712.

At block 710, the GPU 102 (e.g., the command processor(s) 122 of the GPU 102) finish rendering the coarse bin.

At block 712, upon determining either that there are no partially rendered coarse bins or that all identified partially rendered coarse bins have been rendered, the GPU 102 executes (e.g., using the command processor(s) 122) a second workload (e.g., a high priority workload) from the high priority queue 504, the second workload corresponding to the preemption notification received by the GPU 102 at the most recent iteration of block 704.

At block 714, upon executing the second workload, the GPU 102 resumes execution of the first workload in the two-level binning mode. Upon resuming execution of the first workload, the method 700 returns to block 704 to determine whether any additional preemption notifications are received by the GPU 102 prior finishing execution of the first workload.

In some embodiments, the apparatus and techniques described above are implemented in a system including one or more integrated circuit (IC) devices (also referred to as integrated circuit packages or microchips), such as the device 100 including the GPU 102, CPU 104, and system memory 106 as described above with reference to FIG. 1. Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   executing, by at least one processing unit of a system, a first workload in a first binning mode; and
   executing, by the at least one processing unit, a second workload in a selected binning mode that is selected from one of the first binning mode and a second binning mode based on performance heuristics of the system.

2. The method of claim 1, further comprising:
   determining, by the at least one processing unit, that a first workload is a low priority workload based on a first priority indicator of the first workload, the first workload being executed in the first binning mode responsive to determining that the first workload is a low priority workload; and
   determining, by the at least one processing unit, that the second workload is a high priority workload based on a second priority indicator of the second workload, the second workload being executed in the second binning mode responsive to determining that the second workload is a high priority workload.

3. The method of claim 1, wherein the first binning mode is a two-level binning mode, and the second binning mode is a non-two-level binning mode.

4. The method of claim 1, wherein the first binning mode is a two-level binning mode, the method further comprising:
   configuring the first workload to be executed in the first binning mode by:
      dividing an image frame associated with the first workload into a plurality of coarse bins;
      for each coarse bin of the plurality of coarse bins, dividing that coarse bin into a plurality of fine bins; and
      segmenting a plurality of primitives associated with the image frame of the first workload into temporally related primitive batches.

5. The method of claim 4, further comprising:
   receiving, by the at least one processing unit, a preemption notification while executing a first coarse bin of the plurality of coarse bins of the first workload;
   halting, by the at least one processing unit responsive to receiving the preemption notification, execution of the first workload, wherein the executing the second workload occurs while the execution of the first workload is halted; and
   resuming, by the at least one processing unit, the execution of the first workload upon executing the second workload.

6. The method of claim 5, further comprising:
   completing execution of the first coarse bin of the first workload before halting execution of the first workload, wherein resuming the execution of the first workload comprises:
      initiating execution of a second coarse bin of the plurality of coarse bins of the first workload.

7. The method of claim 1, further comprising:
   selecting, the selected binning mode for the second workload by:
      determining whether a two-level binning condition corresponding to a two-level binning mode has been met based on the performance heuristics of the system; and
      determining whether an override condition has been met based on the performance heuristics of the system.

8. The method of claim 7, wherein the two-level binning condition comprises at least one of: an average temperature of the system that includes the at least one processing unit exceeding a first predefined temperature threshold, a first rate of change of the average temperature of the system exceeding a second predefine threshold, a local temperature at a defined location of the system exceeding a third predefined threshold, a second rate of change of the local temperature exceeding a fourth predefined threshold, an average power consumption of the system exceeding a fifth predefined threshold, a peak instantaneous power consumption of the system exceeding a sixth predefined threshold, or a state of charge of a battery being below a seventh predefined threshold.

9. The method of claim 7, wherein the performance heuristics comprise at least one of: an average temperature of the system that includes the at least one processing unit, a first rate of change of the average temperature of the system, an average power consumption of the system, a second rate of change of the average power consumption, a peak instantaneous power consumption of the system, a state of charge of a battery of the system, or applicability of the second workload for execution in the two-level binning mode.

10. A device comprising:
    at least one processing unit configured to:
       execute a first workload in a first binning mode; and
       execute a second workload in a selected binning mode that is selected from one of the first binning mode and a second binning mode based on performance heuristics of the device.

11. The device of claim 10, wherein the at least one processing unit is further configured to:
    determine that the first workload is a low priority workload based on a first priority indicator of the first workload, the first workload being executed in the first binning mode responsive to determining that the first workload is a low priority workload; and
    determine that the second workload is a high priority workload based on a second priority indicator of the second workload, the second workload being executed in the selected binning mode responsive to determining that the second workload is a high priority workload.

12. The device of claim 11, wherein first binning mode is a two-level binning mode, and the second binning mode is a non-two-level binning mode.

13. The device of claim 12, wherein the at least one processing unit is configured to:
    configure the first workload to be executed in the two-level binning mode by:
       dividing an image frame associated with the first workload into a plurality of coarse bins;
       for each coarse bin of the plurality of coarse bins, dividing that coarse bin into a plurality of fine bins; and
       segmenting a plurality of primitives associated with the image frame of the first workload into temporally related primitive batches.

14. The device of claim 13, wherein the at least one processing unit is further configured to:

receive a preemption notification while executing a first coarse bin of the plurality of coarse bins of the first workload;

halt, in response to receiving the preemption notification, execution of the first workload;

execute the second workload while the first workload is halted; and resume execution of the first workload upon executing the second workload.

15. The device of claim 14, wherein the at least one processing unit is further configured to:

complete execution of the first coarse bin prior to halting execution of the first workload, wherein resuming execution of the first workload comprises resuming execution of a second coarse bin of the plurality of coarse bins the first workload.

16. A device comprising:

at least one processing unit configured to:

receive a preemption notification while executing a first coarse bin of an image frame of a first workload in a two-level binning mode;

halt, in response to receiving a preemption notification and after completing execution of the first coarse bin, execution of the first workload;

execute a second workload in a selected binning mode while the first workload is interrupted; and resume execution of the first workload upon executing the second workload.

17. The device of claim 16, wherein the at least one processing unit is further configured to:

select the selected binning mode from one of the two-level binning mode and a non-two-level binning mode based on performance heuristics of the device.

18. The device of claim 17, wherein the at least one processing unit is further configured to:

configure the first workload to be executed in the two-level binning mode by:

dividing an image frame associated with the first workload into a plurality of coarse bins that includes the first coarse bin;

for each coarse bin of the plurality of coarse bins, dividing that coarse bin into a plurality of fine bins; and segmenting a plurality of primitives associated with the image frame of the first workload into temporally related primitive batches.

19. The device of claim 18, wherein the at least one processing unit is configured to execute a second coarse bin of the plurality of coarse bins of the image frame upon resuming execution of the first workload.

20. The device of claim 17, wherein the at least one processing unit is further configured to:

determine that the first workload is a low priority workload based on a first priority indicator of the first workload;

determine that the second workload is a high priority workload based on a second priority indicator of the second workload;

cause the first workload to be submitted to a first queue; and cause the second workload to be submitted to a second queue that is different from the first queue.

* * * * *